United States Patent [19]

Heckmann et al.

[11] Patent Number: 4,591,488

[45] Date of Patent: May 27, 1986

[54] PROCESS FOR SELECTIVE SEPARATION OF PLUTONIUM FROM URANIUM AND OTHER METALS

[75] Inventors: Klaus Heckmann; Jiri Spurny, both of Regensburg, Fed. Rep. of Germany

[73] Assignee: Kernforschungszentrum Karlsruhe GmbH, Karlsruhe, Fed. Rep. of Germany

[21] Appl. No.: 509,193

[22] Filed: Jun. 29, 1983

[30] Foreign Application Priority Data

Jul. 2, 1982 [DE] Fed. Rep. of Germany ....... 3224803

[51] Int. Cl.$^4$ ............................................. C01G 56/00
[52] U.S. Cl. .......................................... 423/11; 423/3; 423/251
[58] Field of Search ............................ 423/311, 1, 251

[56] References Cited

U.S. PATENT DOCUMENTS 2,992,888  7/1961  Balthis ................................ 423/251
3,195,977  7/1965  Matheson ............................ 423/251
4,464,343  8/1984  Hitchcock et al. ..................... 423/3

FOREIGN PATENT DOCUMENTS 1124084   5/1982   Canada ................................. 423/11
1166113   3/1964   Fed. Rep. of Germany .
1175622   8/1964   Fed. Rep. of Germany .
911792   11/1962   United Kingdom ................... 423/11

*Primary Examiner*—Edward A. Miller
*Attorney, Agent, or Firm*—Walter H. Schneider

[57] ABSTRACT

A process for selectively separating plutonium from uranium and other metals is disclosed wherein, in order to precipitate and remove the pertaining complexes, use is made of a sufficient quantity of a cationic compound containing at least one group adapted to assert affinity to polar surfaces and containing a radical which has little affinity to water, e.g. surface active agents and the like, and use is made of the capability of $Pu^{4+}$ and $U^{4+}$ to form nitrato-complexes and of the capability of $Pu^{4+}$ and $UO_2^{2+}$ to form sulfato-complexes.

19 Claims, No Drawings

PROCESS FOR SELECTIVE SEPARATION OF PLUTONIUM FROM URANIUM AND OTHER METALS

BACKGROUND OF THE INVENTION

1. Field of the Invention

The present invention relates generally to improvements in or relating to processes for the selective separation of plutonium and uranium from one another and from other metals.

Nowadays, the processes of jointly separating plutonium and uranium from other metals and the separation of plutonium from uranium are almost always carried out using aqueous solutions. There are presently primarily two methods of particular interest, with each being used in several variations: the solvent extraction method and the ion exchange method. While both methods can, in general, be employed—also on a commercial scale— both still exhibit undesireable disadvantages.

Relative long residence times of organic solvents, agents adapted to form complexes, or resins, in higher radiation density ranges, lead to radiolytical destruction and, thereby, to losses in capacity and detrimental gas formation.

In the case of solvent extraction methods, the penetration of $UO_2{}^{2+}$ and $Pu^{4+}$ through the phase boundary between water and organic solvent, as well as the concentration of precipitates at the phase boundary or interface, present kinetic problems.

When using the mixer-settler technique during solvent extraction, the stationary processing is rendered more difficult by density fluctuations in the organic and aqueous phases during successive extraction and re-extraction steps.

The reaction of ion exchange resins and complex-formers, e.g. tributylphosphate, with concentrated $HNO_3$ presents an unnecessary danger potential.

The separation accuracy of solvent extraction processes, as well as ion exchange processes during the separation of uranium from plutonium, and in the separation of the two elements from one another, is of such a low extent that the separation is generally carried out in several successive steps.

These difficulties are already apparent in the case of relatively well defined solutions obtained, for example, by the dissolution of nuclear fuel elements in concentrated $HNO_3$. Additional difficulties are encountered in such processing when nonuniform solutions are treated, which possibly also contain difficult to define organic materials of fluctuating composition. For such waste waters there have not been advanced fully satisfactory treatment processes so that also the recovery of nuclear fuel elements from such waste waters, the transport, and the storage of remaining residues have not been solved satisfactorily.

2. Description of the Prior Art

A flotation process for inorganic ions has been described in DE-AS 1 166 113 (DE-AS=German patent publication) in which process in conformity with the loading of the ion to be floated, there is added to the ion-containing solution an anionic or cationic collector and in which the so-formed insoluble reaction product is floated or slurried under introduction of a gas and removed as a foam or froth. In accordance with this prior art process the uranium may be separated from uranylsulfate solutions, albeit with poor yields.

In German Pat. No. 2 817 029 there is disclosed a process for selectively separating and recovering uranium from accompanying metals. In accordance with this prior art process hydrochloric acid is added to an aqueous solution containing uranium until the $UO_2{}^{2+}$ forms anionic chloro-complexes, a surface active agent is added, and the resultant precipitate is floated in a flotation cell. Uranium is recovered from the floated precipitate. While this prior art process allows recovery of uranium at a higher yield in comparison to the process of German patent publication No. 1 166 113, its particular drawbacks reside therein that it is based on the use of hydrochloric acid and, accordingly, can not be utilized on a larger scale without precautionary measures due to corrosion.

In accordance with German Pat. No. 2 902 516, the process of German Pat. No. 2 817 029 is extended to solutions containing sulfuric acid. This provides yields and concentrations of uranium which are superior in comparison with the process of German patent publication No. 1 166 113. However, the flotation time is longer and the concentration or enriching is lower than suggested by the process according to German Pat. No. 2 817 029; on the other hand, the corrosion dangers have been reduced.

In any event, the foregoing references do not provide a teaching of how to separate plutonium from uranium by means of particular organic compound-assisted precipitation.

SUMMARY OF THE INVENTION

There has continued to remain, therefore, a need to provide a new or improved process of separating uranium and plutonium which process does not exhibit the drawbacks indicated briefly in the foregoing, or only to a lesser extent.

In general terms, it was investigated whether plutonium could be precipitated from aqueous solutions as a substantially insoluble precipitate, either as a cation or as complex anion, using either anionic or cationic compounds containing at least one group adapted to assert affinity to polar surfaces and also containing a radical which has little affinity to water, whereby the plutonium could be separated, in this manner, selectively from uranium or other elements. It was further investigated whether plutonium precipitated in this manner would lead to hydrophobic precipitates which could be rapidly removed from the mother liquor by means of ionic flotation, or precipitationflotation, respectively.

It is an object of the present invention to provide a process for separating plutonium and uranium which is simple, provides a method for the recovery of plutonium from nuclear-plant wastes and other radioactive wastes, and is devoid of the disadvantages of the prior art processes.

In accordance with one aspect of the present invention there is provided a process for selectively separating plutonium and uranium comprising the steps of: adding nitric acid in certain amounts to a solution containing $Pu^{4+}$ and $UO_2{}^{2+}$, with the amount of nitric acid added being sufficient such that the $Pu^{4+}$ forms anionic nitrato-complexes, adding, prior to, or with, or during, addition of the nitric acid, a compound containing at least one group adapted to assert affinity to polar surfaces and also containing a radical which has little affinity to water, separating the resultant precipitate from its mother liquor, and recovering the plutonium from the precipitate.

In accordance with another aspect of the present invention there is provided a process for selectively separating plutonium and uranium which comprises the steps of: adding, to a solution containing $Pu^{4+}$ and $UO_2^{2+}$, sulfuric acid in such an amount that the uranium forms anionic sulfato-complexes, adding a sufficient amount of a cationic compound containing at least one group adapted to assert affinity to polar surfaces and also containing a radical which has little affinity to water, separating the resultant precipitate from its mother liquor, adjusting, after separation of the uranium-containing precipitate, the pH value in the remaining mother liquor in such a way that the $Pu^{4+}$ forms anionic sulfato-complexes, adding a further amount of said cationic compound, separating the resultant precipitate from its mother liquor, and recovering plutonium from the precipitate.

In accordance with a further aspect of the invention there is provided a process for selectively separating plutonium and uranium which comprises the steps of: adding to a solution containing $Pu^{4+}$ and $UO_2^{2+}$ such an amount of sulfuric acid that $Pu^{4+}$ as well as $UO_2^{2+}$ form anionic sulfato-complexes, next adding iron(II)sulfate or other suitable reducing agents in such an amount the $Pu^{4+}$ present is reduced to $Pu^{3+}$, adding a cationic compound containing at least one group adapted to assert affinity to polar surfaces and also containing a radical which has little affinity to water, separating the resultant precipitate from its mother liquor, and recovering uranium from the precipitate. After separation of the uranium-containing precipitate, the process is continued by adding to the remaining mother liquor either sodium nitrite or peroxodisulfate, or other oxidizing agents, in such an amount that the $Pu^{3+}$ is re-oxidized, adding a further amount of said cationic compound, separating the resulting plutonium-containing precipitate, and recovering the plutonium from the precipitate.

Electrolytic methods can be employed correspondingly instead of the reducing agents during the reduction and/or the oxidizing agents during the re-oxidation, respectively.

In accordance with yet another aspect of the present invention there is provided a process for selectively separating plutonium and uranium which process comprises the steps of: adjusting the sulfuric acid concentration and the pH of a solution containing $Pu^{4+}$ and $UO_2^{2+}$ in such a way that both elements form anionic sulfatocomplexes, adding a cationic compound containing at least one group adapted to assert affinity to polar surfaces and also containing a radical which has little affinity to water, separating the resultant precipitate from its mother liquor, suspending the precipitate in nitric acid for re-dissolution of the precipitated uranium, and isolating plutonium from the remaining precipitate and uranium from the uranium-containing solution.

In accordance with the present invention the exposure time of the utilized organic material is to be held at a minimum when exposed in ranges of high radiation densities or fluxes. Furthermore, the amount of the compound used is to be minimized. A process in accordance with the present invention is to be carried out exclusively in an aqueous environment so as to avoid problems of phase penetration kinetics (phase transfer kinetics) and density fluctuations of a two-phase system.

In continuation of the efforts of isolating, using flotation and enriching or concentration techniques, $UO_2^{2+}$ from homogeneous aqueous solutions by means of cationic compounds containing at least one group adapted to assert affinity to polar surfaces and also containing a radical having little affinity to water, as suggested in German Pat. No. 2 817 029, the possibility was examined to apply such technique in the isolation and enriching or concentration of $Pu^{4+}$. In this context, there was utilized the known finding that $Pu^{4+}$ and $U^{4+}$ are capable of forming sulfato-complexes, as well as nitrato-complexes and, accordingly, satisfy the essential requirement for precipitation-flotation using such cationic compounds.

It was surprisingly found that $Pu^{4+}$ and $U^{4+}$ can be precipitated as nitrato-complexes using the cationic compounds referred to, with a preferred compound comprising cetylpyridinium, from nitric acid or nitrate-containing solutions at concentrations of $NO_3^-$ of less than 10 M, whereas $UO_2^{2+}$ would not be precipitated. This is even more surprising since one had to conclude, on the basis of the bonding capability of anionic exchange resins for uranium in nitric acid solutions, that $UO_2^{2+}$ would also be capable to form nitrato-complexes.

It was furthermore surprising that the cationic compounds used for precipitation, particularly the alkylpyridinium salts, exhibit a high stability under the influence of radioactive radiation. Thus, radiation doses of up to $10^6$ rad did not cause a detectable influence on the precipitation characterstics or capability of the cetylpyridinium cation. Only at $10^8$ rad could be noted a significant, approximately 30%, decrease of the precipitation capability.

Thus, in accordance with the invention there is provided a simple and highly selective process for the separation of $Pu^{4+}$ and $UO_2^{2+}$ and for the recovery of both ions from aqueous solutions. In accordance with the present invention it is not required that organic solvents or ion exchange resins are used. Instead highly radiation-resistant reagents are used, and the residence time of these in the solution is, furthermore, relatively short. In accordance with the invention, one can separate $Pu^{4+}$ from $UO_2^{2+}$ and associated metals, in nitric acid solutions, provided the associated metals do not form nitrato-complexes, or only form anionic nitrato-complexes less stable than $Pu^{4+}$, and which do not precipitate an addition of said cationic compounds.

$Pu^{4+}$ as well as $UO_2^{2+}$ form, in sulfuric acid solutions and in sulfate-containing solution, sustantially insoluble precipitates on addition of the cationic compounds mentioned before. Thus, $Pu^{4+}$ and $UO_2^{2+}$ can either jointly or individually be separated from all associated metals in such solutions which do not form sulfato-complexes, or only sulfato-complexes which are less stable than $Pu^{4+}$ and $UO_2^{2+}$ and which do not precipitate on addition of cationic compounds of the class described.

Thus, in accordance with the present invention there are indicated several methods for the separation of uranium and plutonium: $Pu^{4+}$ is precipitated as a substantially insoluble complex from a solution containing $Pu^{4+}$ and $UO_2^{2+}$ in the presence of nitric acid. The $UO_2^{2+}$ remains in solution and it can be precipitated either by the addition of sulfate ions as sulfato-complex, or upon reduction to $U^{4+}$ as nitrato-complex.

$Pu^{4+}$ and $U^{4+}$ are together precipitated from nitric acid solution. The precipitate is subjected to a selective oxidation such that $U^{4+}$ is converted to $UO_2^{2+}$ and is re-dissolved in the solution.

$UO_2^{2+}$ and $Pu^{4+}$ are precipitated together from sulfate-containing solutions, and subsequently $UO_2^{2+}$ is redissolved from the precipitate by nitric acid.

In a sulfate-containing solution of both metals the $Pu^{4+}$ is reduced to $Pu^{3+}$, and the $UO_2^{2+}$ is precipitated as substantially insoluble complex by cationic compounds of the class indicated above. After re-oxidation of the $Pu^{3+}$ to $Pu^{4+}$, $Pu^{4+}$ is then also precipitated.

In a sulfate-containing solution also containing $Pu^{4+}$ and $UO_2^{2+}$ the pH value is adjusted in two steps in such a way that initially one element forms a substantially insoluble precipitate, and then the other, on addition of cationic compounds of the class indicated herein, followed by separation of the materials of interest.

In nitric acid solution, $Pu^{4+}$ is reduced to $Pu^{3+}$ and $UO_2^{2+}$ is reduced to $U^{4+}$. The $U^{4+}$ is then precipitated by use of a cationic compound. The $Pu^{3+}$ is re-oxidized to $Pu^{4+}$ and is also precipitated.

The lower limit of the concentration of nitric acid is from between 0.1 to 1.0 N $HNO_3$. An upper limit could not be determined to-date. It was found that one could use concentrations of 10 N $HNO_3$.

At concentrations of $HNO_3$ of less than 10 N, $UO_2^{2+}$ forms a complex $UO_2NO_3^+$. At a concentration of $HNO_3$ of greater than 10 N, there result anionic complexes (through adsorption of uranium on anionic exchangers), but the composition of these complexes is unknown. In $HNO_3$, $Pu^{4+}$ forms all complexes from $Pu(NO_3)^{3+}$ to $Pu(NO_3)_6^{2-}$ (compare: I. M. Cleveland, The Chemistry of Plutonium, American Nuclear Society). $Pu^{3+}$ does not form anionic nitrato-complexes.

The cationic compound referred to herein is optimally added at slightly higher concentrations than stoichiometric concentrations, approximately at an excess of 1.01 to 1.05. When one adds a substantially greater amount of such cationic compound, of course, more metal enters the precipitate, however, unnecessary intensive foaming or frothing occurs, and the duration of the flotation process is extended. Furthermore, the flotation characteristics of the precipitate deteriorate.

If flotation is not desired, but instead centrifuging or filtration is used, the cationic compound may be used at higher concentrations, e.g. 1.01 to 1.50 equivalence.

U an Pu can be separated from the majority of radioactive fission products which are generated in a reactor. The separation is easy when the other metals do not form anionic complexes and/or anionic poly-acids, or heteropolyacids, respectively. The separation of anionic complexes and/or poly-acids is achieved in substantially all cases as well when one either somewhat varies ligand concentration ($NO_3^-$, $SO_4^{2-}$), or the pH, or U or Pu, respectively, or selectively oxidizes or reduces, respectively, the other metals. Thus, even the separation of Pu from Ce (which represents a simulate for Pu and also represents an important fission product) by selective reduction of the $Ce^{4+}$ to $Ce^{3+}$ can be achieved. The $Ce^{3+}$ does not form precipitates on addition of cationic compounds as referred to.

Of primary importance is the separation of Pu and U from nitric acid or nitrate-containing solutions. On precipitation with appropriate cationic compounds as outlined herein, aside from $Pu^{4+}$, only the ions $Ce^{4+}$, $Ru^{2+}$, $Mo^{6+}$, $U^{4+}$ and $Th^{4+}$ precipitate. Depending on the given problem, these elements can either be separated by selectivity in the precipitation conditions, or by a subsequent process, from the plutonium, or they may also be left with the plutonium.

The invention is generally applicable to the separation of U and Pu from any starting materials which contain U and Pu. Thus, both elements were removed from two types on non-specific, medium-active-waste waters (obtained from the Nuclear Research Center Karlsruhe, Germany):

1. From solutions which are collected in a central collecting tank and emanate from various laboratories. On average, the composition of such waste waters is somewhat constant. With good approximation this solution contains: $Na^+$, $Al^{3+}$, $Ca^{2+}$, $Cr^{3+}$, $Cu^{2+}$, $Fe^{3+}$, $Mg^{2+}$, $Mn^{2+}$, $MoO_4^{2-}$, $Ni^{2+}$, $Zn^{2+}$, and $ZrO^{2+}$ in 1 M $NHO_3$, from which plutonium and, as required, also uranium are recovered.

2. From solutions which come from wet-incinerated Pu-containing wastes (rubber gloves, crucible tongs, towels, filter paper and the like) of the production of plutonium oxide. These are sulfuric acid solutions (1 to 2 M $H_2SO_4$) which, aside from plutonium and, possibly, uranium, also contain $Al^{3+}$, $Ca^{2+}$, $Cr^{3+}$, $Cu^{2+}$, $Fe^{3+}$, $Mg^{2+}$, $Mn^{2+}$, $Ni^{2+}$, $Sn^{4+}$, $TiO^{2+}$, and $Zn^{2+}$.

With respect to other operating conditions and techniques reference may be had to German patent No. 2 817 029.

The following examples serve to further illustrate the invention.

EXAMPLE 1

SELECTIVE PRECIPITATION OF $Pu^{4+}$ AS NITRATO-COMPLEX IN THE PRESENCE OF $UO_2^{2+}$

A solution was produced containing 625 mg $UO_2^{2+}$ and 25 mg $Pu^{4+}$ in 100 ml of 7.0 M $HNO_3$. Solid cetylpyridinium chloride, 4 g, was dissolved in the solution. After several minutes a green precipitate of fine crystals was obtained. This was stirred for 30 minutes and subsequently filtered.

EXAMPLE 2

JOINT PRECIPITATION OF $Pu^{4+}$ AND $UO_2^{2+}$ AS SULFATO-COMPLEXES AND SEPARATION IN $HNO_3$

In 75 mg of 1.3 M $H_2SO_4$ were dissolved 25 mg $Pu^{4+}$, containing also $Pu^{6+}$ and $Pu^{3+}$, and 635 mg $UO_2^{2+}$, and 1 g solid $NaNO_2$ was added. Upon dissolution of the salt, the pH of the solution was adjusted to 2.5 by the addition of aqueous ammonia, and water was added to bring the solution to 100 ml. In this solution 4 g solid cetylpyridinium chloride was dissolved. After several minutes a yellow precipitate of fine crystals was obtained which was filtered after stirring for 30 minutes.

The filtrate contained only 1.13% of the initially dissolved $Pu^{4+}$ and 0.8% of the initially dissolved $UO_2^{2+}$. The recovery of plutonium in the precipitate was, accordingly, 98.78% and that of uranium 99.19%.

The precipitate was then suspended in 10 ml of 1.0 M $HNO_3$. The uranium-containing part of the precipitate was dissolved, while the plutonium-containing part remained in suspension. The precipitate was separated by centrifuging, and the uranium was removed from the mother liquor by neutralizing with aqueous ammonia, in the form of ammonium diuranate.

EXAMPLE 3

SELECTIVE PRECIPITATION OF $UO_2^{2+}$ AS SULFATO-COMPLEX IN THE PRESENCE OF $Pu^{4+}$

In 75 ml of a 1.3 M $H_2SO_4$ solution were dissolved 24 mg $Pu^{4+}$ and 632 mg $UO_2^{2+}$, and 152 mg solid $FeSO_4$ was added. Upon dissolution of the salt the pH was adjusted to 2.5 by the addition of aqueous ammonia, and water was added to bring the solution to 100 ml. The solution was subsequently treated as described in EXAMPLE 2. The uranium reported at 99.46% in the precipitate, and the plutonium reported at 97.8% in the filtrate.

EXAMPLE 4

SELECTIVE PRECIPITATION OF $Pu^{4+}$ AS NITRATO-COMPLEX IN THE PRESENCE OF $UO_2^{2+}$ AND $Am^{3+}$

A solution was produced containing 37.2 µg $Pu^{4+}$, 3.66 mg $UO_2^{2+}$, and an unknown but relatively small amount of $Am^{3+}$, in 100 ml of 7.0 M $HNO_3$. To the solution was added 120 mg solid cetylpyridinium chloride which disolved rapidly. The subsequent, green precipitate was stirred for 30 minutes and then filtered. The precipitate contained 91% plutonium, and uranium and americium reported at 97.7% each in the filtrate.

EXAMPLE 5

FRACTIONATED PRECIPITATION OF $UO_2^{2+}$ AND $Pu^{4+}$ BY VARYING THE pH VALUE

In 200 ml 1.0 M $H_2SO_4$ were dissolved 25 mg $Pu^{4+}$ and 635 mg $UO_2^{2+}$, and the pH value was adjusted to 1.5 by the addition of aqueous ammonia. After addition of 3.8 g cetylpyridinium chloride and stirring for 30 minutes, the resultant precipitate was filtered and analyzed. It contained 98.2% of the initial uranium content and less than 1% of the entire Pu-activity. The pH of the filtrate was adjusted to 3.0 by the addition of aqueous ammonia. The plutonium was precipitated by a further addition of 100 mg cetylpyridinium chloride. The plutonium-containing precipitate was filtered and analyzed. It contained 97.9 % of the initial Pu-activity and only traces of uranium.

EXAMPLE 6

FRACTIONATED PRECIPITATION OF PLUTONIUM AND URANIUM FROM NITRIC ACID SOLUTIONS

A solution of 625 mg $UO_2^{2+}$ and 25 mg $Pu^{4+}$ in 100 ml 4.3 M $HNO_3$ was prepared. To this solution was added a solution of 0.1 g cetylpyridinium chloride in 3 ml of 4.3 N $HNO_3$. After a few minutes a green precipitate of fine crystals was formed which was stirred for 30 minutes and then filtered. The filtrate was added to a sufficient amount of hydrazine, sufficient to produce a 0.2 molar hydrazine solution, and it was then introduced into a special electrolysis cell. The uranium was electrolytically reduced from $UO_2^{2+}$ to $U^{4+}$. The reduction was carried out using a platinum screen as anode and mercury as cathode, at a voltage of 4.5 V. The 4-valent uranium was subseqeuntly precipitated by addition of a further 4 g of cetylpyridinium chloride (dissolved in 10 ml 0.3 N $HNO_3$ at 60° C.), and the suspension was again stirred for 30 minutes. Upon filtration of the uranium-containing precipitate, the filtrate was evaporated, and the residue as well as the two metalcontaining precipitates, were analyzed. The plutonium precipitate contained 97.8% of the starting plutonium-activity and only trace amounts of uranium. The uranium precipitate contained 94.3% of the starting uranium content and less than 1% of the starting plutonium-activity.

In this invention, the terminology: a compound containing at least one group adapted to assert affinity to polar surfaces and also containing a radical having little affinity to water, is intended to convey the meaning of the German chemical expression TENSID. The expression is derived from the Latin and suggests 'tensioned'. According to the 6th Edition of the German chemical encyclopedia 'Römpp's Chemie Lexicon', the definition given therein embraces at least portions of and all of the following terms and agents: surface active agents, phase[-surface]-active agents, detergents, surfactants, syndets and the like. This definition of TENSID has been proposed at the session of the Commission Internationale de Terminologie des Comité International de la Détergence, on Feb. 24, 1960, in Luzern, Switzerland.

Reference in this disclosure to details of the specific embodiments is not intended to restrict the scope of the appended claims, which themselves recite those features regarded as essential to the invention.

We claim:

1. A process for selective separation of plutonium and uranium from solutions comprising the steps of: adding to a solution containing $Pu^{4+}$ and $UO_2^{2+}$ such an amount of nitric acid that the $Pu^{4+}$ forms anionic nitrato-complexes; adding to said solution a cationic compound containing at least one group adapted to assert affinity to polar surfaces and also containing a radical which has little affinity to water; separating the resultant precipitate from the mother liquor; and recovering plutonium from said precipitate.

2. A process according to claim 1 wherein said cationic compound is added during the step of adding nitric acid.

3. A process according to claim 1 wherein said cationic compound is added prior to the step of adding nitric acid.

4. A process according to claim 1 wherein said cationic compound is added after the step of adding nitric acid.

5. A process for selectively separating plutonium and uranium comprising the steps of: providing a solution containing $Pu^{4+}$ and $UO_2^{2+}$; adjusting the pH and sulfuric acid concentration in such a way that both elements form anionic sulfato-complexes; introducing an effective amount of a cationic compound containing at least one group adapted to assert afinity to polar surfaces and also containing a radical which has little affinity to water; separating the resultant precipitate from its mother liquor; suspending said precipitate in nitric acid thereby dissolving the precipitated uranium; and isolating plutonium from the remaining plutonium-containing precipitate and uranium from the pertaining uranium-containing solution.

6. A process according to claim 1 wherein said solution containing $Pu^{4+}$ and $UO_2^{2+}$ includes a 1.0 N to 10.0 N aqueous nitric acid solution.

7. A process according to claim 1 wherein said cationic compound includes a member selected from the group consisting of long chain alkylpyridinium salts, alkylamine or salts thereof, alkyldimethylnaphtylammonium salts, alkylated arylamine or their salts, alkylated morpholine or its salts, oxalkylated pyridinium or its salts, alkylated quinoline or its salts.

8. A process according to claim 7 wherein said cationic compound comprises a mixture of at least two of said members.

9. A process according to claim 7 wherein said long chain alkyl radicals are branches or straight chains containing from 4 to 24 carbon atoms.

10. A process according to claim 1 wherein said cationic compound includes a member selected from the group consisting of N-cetylpyridinium salt and N-octadecylpyridinium salt.

11. A process according to claim 1 wherein said cationic compound is added in an amount corresponding to 1 to 10-fold equivalence with respect to uranium and plutonium, respectively.

12. A process according to claim 11 wherein said cationic compound is added in an amount of from 1.01 to 1.10-fold equivalence with respect to uranium and plutonium, respectively.

13. A process according to claim 1 wherein said separating of pertaining plutonium-containing precipitate and of pertaining uranium-containing precipitate is carried out by flotation, said flotation including: passing pertaining material to be floated through several flotation cells, adding an inert gas for frothing, dewatering the floated precipitate-containing froth, suspending the precipitate in a small amount of water, heating the suspension for dissolution of the pertaining precipitate, adjusting the pH value for re-precipitation of $Pu^{4+}$ and $UO_2^{2+}$, respectively, as plutonate and uranate, separating pertaining precipitate, and recycling cationic compound-containing filtrate to said flotation.

14. A process according to claim 13 wherein said inert gas comprises a gas selected from the group consisting of air and nitrogen.

15. A process according to claim 13 wherein said flotation cells are connected in series.

16. A process according to claim 13 wherein said flotation cells are connected in parallel.

17. A process according to claim 1 wherein said solution containing plutonium and uranium further contains other metal ions, said other metal ions being adapted to form complexes other than anionic complexes and being substantially unaffected to precipitation by said cationic compound.

18. A process according to claim 17 wherein said other metal ions are adapted to form anionic complexes which are weaker than $UO_2^{2+}$ and $Pu^{4+}$, respectively.

19. A process according to claim 1 which process is operated continuously.

* * * * *